United States Patent
Obara et al.

(10) Patent No.: US 9,423,037 B2
(45) Date of Patent: Aug. 23, 2016

(54) DIAPHRAGM WITH FLANGE AND ANNULAR RIDGE AND DIAPHRAGM VALVE USING THE SAME

(71) Applicant: Kabushiki Kaisha Fujikin, Osaka-shi Osaka (JP)

(72) Inventors: Shunji Obara, Osaka (JP); Yoshinori Shimomura, Osaka (JP); Masahiko Sogao, Osaka (JP); Keigo Kobayashi, Osaka (JP)

(73) Assignee: KABUSHIKI KAISHA FUJIKIN (JP)

( * ) Notice: Subject to any disclaimer, the term of this patent is extended or adjusted under 35 U.S.C. 154(b) by 0 days.

(21) Appl. No.: 14/403,606

(22) PCT Filed: Mar. 21, 2013

(86) PCT No.: PCT/JP2013/058018
§ 371 (c)(1),
(2) Date: Nov. 25, 2014

(87) PCT Pub. No.: WO2013/179738
PCT Pub. Date: Dec. 5, 2013

(65) Prior Publication Data
US 2015/0167853 A1 Jun. 18, 2015

(30) Foreign Application Priority Data
May 30, 2012 (JP) .................................. 2012-123792

(51) Int. Cl.
*F16K 7/12* (2006.01)
*F04B 43/00* (2006.01)
(Continued)

(52) U.S. Cl.
CPC .............. *F16K 7/12* (2013.01); *F04B 43/0054* (2013.01); *F16J 3/02* (2013.01); *F16K 7/126* (2013.01); *F16K 27/0236* (2013.01); *F16K 31/1221* (2013.01)

(58) Field of Classification Search
CPC ........ F16K 7/12; F16K 7/126; F16K 31/1221; F16J 3/02; F04B 43/0054
USPC ..... 251/331, 335.2; 92/98 R, 103 F; 137/375
See application file for complete search history.

(56) References Cited

U.S. PATENT DOCUMENTS 2,684,829 A * 7/1954 McFarland, Jr. ....... F16K 7/126
251/267
2,725,211 A * 11/1955 Boteler .................. F16K 7/126
251/331

(Continued)

FOREIGN PATENT DOCUMENTS

JP 198729166 9/1988
JP 19920037468 9/1993

(Continued)

OTHER PUBLICATIONS

International Search Report, PCT/JP2013/058018, date of mailing May 21, 2013.

(Continued)

*Primary Examiner* — John Bastianelli
(74) *Attorney, Agent, or Firm* — Andrus Intellectual Property Law, LLP (57) ABSTRACT

A durable diaphragm valve has a single-layer structure consisting of rubber materials. The single-layer structure has a membrane part deforming and moving up and down with opening and closing of a flow channel and a flange part which is provided around said membrane part and sandwiched between a valve body and a bonnet. The flange part has an annular ridge consisting of an upper ridge protruding upward and a lower ridge protruding downward from a position corresponding to said upper ridge. The upper ridge has an inner upper ridge and an outer upper ridge with its protruding height being lower than the inner upper ridge, which are consecutively formed in a staircase pattern.

7 Claims, 6 Drawing Sheets

(51) Int. Cl.
*F16J 3/02* (2006.01)
*F16K 31/122* (2006.01)
*F16K 27/02* (2006.01)

(56) References Cited

U.S. PATENT DOCUMENTS

| | | | | |
|---|---|---|---|---|
| 2,840,339 | A | * | 6/1958 | Price ................ F16J 3/02 251/331 |
| 2,855,176 | A | * | 10/1958 | Boteler .............. F16K 7/126 251/252 |
| 2,988,322 | A | * | 6/1961 | Anderson ........... F16K 7/126 251/331 |
| 3,011,758 | A | * | 12/1961 | McFarland, Jr. ...... F16K 7/126 251/331 |
| 3,067,764 | A | * | 12/1962 | Geary ................ F16K 7/123 137/315.04 |
| 5,062,455 | A | * | 11/1991 | Schurter ............. F15B 1/125 138/30 |
| 5,505,814 | A | | 4/1996 | Satou et al. |
| 6,216,731 | B1 | * | 4/2001 | Frenkel ............. F16K 31/126 137/556 |
| 6,505,814 | B1 | * | 1/2003 | Satou ................ F16K 7/123 137/863 |
| 2006/0175573 | A1 | | 8/2006 | Ohmi |
| 2009/0072173 | A1 | * | 3/2009 | Hasunuma ........... F16K 7/12 251/129.12 |
| 2010/0012868 | A1 | * | 1/2010 | Lodolo ............. F16K 31/385 251/25 |
| 2010/0071776 | A1 | | 3/2010 | Ringer et al. |
| 2013/0014639 | A1 | * | 1/2013 | Takeshita ........... F15B 1/125 92/96 |
| 2014/0077108 | A1 | | 3/2014 | Ringer et al. |

FOREIGN PATENT DOCUMENTS

| | | |
|---|---|---|
| JP | H07208623 | 8/1995 |
| JP | 10318368 | 12/1998 |
| JP | 2004463576 | 9/2004 |
| JP | 2009002442 | 1/2009 |
| JP | 2009036304 | 2/2009 |
| JP | 4232939 | 3/2009 |
| JP | 20090074243 | 7/2009 |
| WO | 9627095 | 9/1996 |
| WO | 9627096 | 9/1996 |
| WO | 2011/122424 | 10/2011 |

OTHER PUBLICATIONS

English translation of Office Action issued Oct. 19, 2015 regarding corresponding Korea patent application 10-2014-7032917 together with Office Action in Korean.

English translation of Office Action issued Nov. 3, 2015 regarding corresponding China patent application 201380027232.X together with Office Action in Chinses.

* cited by examiner

Section A-A
Full Opened State

Section B-B

Section A-A    Section B-B
Full Closed State

Fig. 8

DIAPHRAGM WITH FLANGE AND ANNULAR RIDGE AND DIAPHRAGM VALVE USING THE SAME

CROSS REFERENCE TO RELATED APPLICATION

The present application is the U.S. national stage application of International Application PCT/JP2013/058018, filed Mar. 3, 2013. The International Application claims priority of Japanese Patent Application 2012-123792, filed May 30, 2012.

TECHNICAL FIELD

The present invention relates to a diaphragm and a diaphragm valve, more particularly a diaphragm with high durability which can restrain reduction of sealing properties and occurrence of a crack resulting from repeated opening and closing of a flow channel of the diaphragm valve, and a diaphragm valve.

BACKGROUND OF THE INVENTION

Conventionally, a two-layer structure with a synthetic resin membrane consisting of PTFE, etc. and a rubber membrane consisting of EPDM, FPM, etc. is known as a diaphragm attached to a diaphragm valve. (For example, see Japanese Patent No. 4232939)

Figure 8:
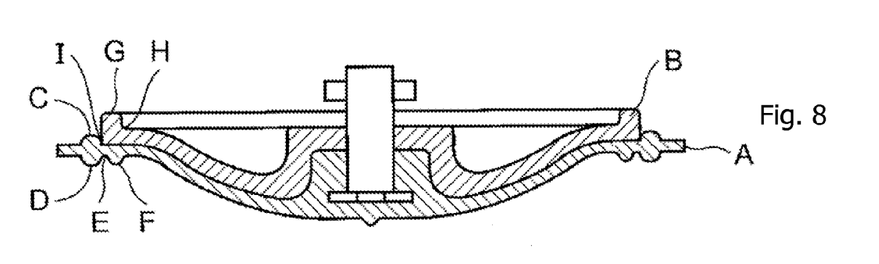
FIG. 8 is a longitudinal sectional view showing an example of the diaphragm of the conventional two-layer structure.

FIG. 8 is a longitudinal sectional view showing an example of a diaphragm having a two-layer structure.

This diaphragm has a two-layer structure in which a rubber membrane (B) consisting of EPDM, FPM, etc. is laminated on a synthetic resin membrane (A) consisting of PTFE, etc.

An annular ridge, which functions as a guide when attached to the diaphragm valve, is provided in a vicinity of an outer edge of the synthetic resin membrane (A). This ridge consists of an upper ridge (C) protruding upward and a lower ridge (D) protruding downward from a position corresponding to the upper ridge. A lower seal ridge (F) is provided inward from the lower ridge (D) in order to secure sealing properties by being close to a valve body with a groove (E) between them.

The rubber membrane (B) is laminated inside the upper ridge (C) of the synthetic resin membrane (A), and an upper seal ridge (G) is provided on the outer edge part of the rubber membrane (B) in order to secure sealing properties by being close to a bonnet.

However, such diaphragm having a two-layer structure had a problem of the increased number of parts and increased manufacturing man-hours resulting in an increase of a manufacturing cost, compared with a diaphragm having a single-layer structure. Also, the PTFE membrane has a poor flexibility compared with the rubber membrane, thus it had a problem of a substantial reduction of sealing properties if biting of foreign substances occurs.

On the other hand, in the case of the diaphragm having a single-layer structure which consists only of a rubber material, the above-mentioned problem did not occur, but there was a problem of low durability.

For example, if the diaphragm shown in FIG. 8 has a single-layer structure which consists only of a rubber material, it is largely compression deformed when tightening and fixing a peripheral edge part of the diaphragm between the valve body and the bonnet, compared with a diaphragm having a two-layer structure with a PTFE layer. At this time, an edge of the groove, into which the upper seal ridge (G) formed on the lower surface of the bonnet fits, abuts on an inner root part (H) and an outer root part (I) of the upper seal ridge (G), so that a large stress is applied to them.

Therefore, if the diaphragm is repeatedly moved up and down for opening and closing of the flow channel, a crack will occur with these root parts (H), (I) as the starting points in a short period of time.

SUMMARY OF THE INVENTION

Problems to be Solved by the Invention

The present invention is to solve the above-mentioned problems of prior art and provides a diaphragm which is economical and excellent in durability, wherein the diaphragm is less likely to cause reduction of sealing properties and occurrence of a crack due to repeated up and down movements though it has a single-layer structure consisting only of rubber materials, and a diaphragm valve having this diaphragm.

Means for Solving the Problems

According to a first aspect of the invention, there is a diaphragm attached to a diaphragm valve. The diaphragm has a single-layer structure consisting of rubber materials, and comprises a membrane part deforming and moving up and down with opening and closing of a flow channel and a flange part which is provided around said membrane part and sandwiched between a valve body and a bonnet, wherein said flange part has an annular ridge, wherein said annular ridge consists of an upper ridge protruding upward and a lower ridge protruding downward from a position corresponding to said upper ridge, wherein said upper ridge has an inner upper ridge and an outer upper ridge with its protruding height being lower than the inner upper ridge, which are consecutively formed in a staircase pattern.

According to a second aspect of the invention, the height of the inner vicinity part of said inner upper ridge is lower than that of said outer upper ridge.

According to a third aspect of the invention, said lower ridge has an inner lower ridge and an outer lower ridge with its protruding height being higher than the inner lower ridge, which are consecutively formed in a staircase pattern.

According to a fourth aspect of the invention, the height of said inner lower ridge is higher than that of the outer vicinity part of said outer lower ridge.

According to a fifth aspect of the invention, the diaphragm includes a reinforcing cloth at a substantially intermediate position in a thickness direction.

According to a sixth aspect of the invention, said reinforcing cloth consists of nylon.

According to a seventh aspect of the invention, the surface of the diaphragm is coated in a thin film state with a resin film.

According to an eighth aspect of the invention, the invention relates to a diaphragm valve having the diaphragm with some or all of the characteristics and features described above.

Effects of the Invention

In the first aspect of the invention noted above, the diaphragm of the single-layer structure consisting of rubber materials has a structure in which the upper ridge of the annular ridge provided on the flange part has the inner upper ridge and the outer upper ridge with its protruding height being lower than the inner upper ridge, which are consecutively formed in a staircase pattern, so that the outer upper ridge can restrain deformation of the inner upper ridge. Therefore, reduction of sealing properties can be prevented which results from generation of stress relaxation to the inner upper ridge. As a result, a diaphragm with excellent durability can be obtained even though it has a single-layer structure consisting of rubber materials.

In the second aspect of the invention noted above, the height of the inner vicinity part of the inner upper ridge is lower than that of the outer upper ridge, so that application of large stress to the root part of the inner upper ridge can be prevented. Therefore, a crack can be prevented from occurring in a short period of time with the root part as a starting point, so that a diaphragm with further excellent durability can be obtained.

In the third aspect of the invention noted above, the lower ridge has the inner lower ridge and the outer lower ridge with its protruding height being higher than the inner lower ridge, which are consecutively formed in a staircase pattern, so that the inner lower ridge, which functions as a sealing surface, can be securely and tightly contacted with respect to the valve body with its wide area contacted, thereby improving sealing properties.

In the fourth aspect of the invention noted above, the height of said inner lower ridge is higher than that of the outer vicinity part of said outer lower ridge, so that the inner lower ridge, which functions as a sealing surface, can be tightly contacted with respect to the valve body with high pressure, thereby improving sealing properties.

In the fifth aspect of the invention noted above, the diaphragm includes a reinforcing cloth at a substantially intermediate position in a thickness direction, so that a reinforcement effect can be sufficiently exhibited by the reinforcing cloth, thereby obtaining a diaphragm with excellent durability.

In the sixth aspect of the invention noted above, the reinforcing cloth consists of nylon, so that a high reinforcement effect can be exhibited by the reinforcing cloth, thereby obtaining a diaphragm with very excellent durability.

In the seventh aspect of the invention noted above, the surface of the diaphragm is coated in a thin film state with the resin film, so that a reinforcement effect can be exhibited by the resin film, thereby obtaining a diaphragm with excellent durability.

In the eighth aspect of the invention noted above, the diaphragm valve has the diaphragm described above, so that a diaphragm valve having a diaphragm which is economical and excellent in durability can be obtained, which can restrain reduction of sealing properties and occurrence of a crack resulting from repeated opening and closing of the flow channel of the diaphragm valve.

BRIEF DESCRIPTION OF FIGURES

FIG. 1 (a) is a top view, FIG. 1 (b) is a sectional view taken along the line A-A of FIG. 1 (a), and FIG. 1 (c) is a bottom view.

FIG. 2 (a) is an enlarged view in the circle of FIG. 1 (b) and FIG. 2 (b) shows the change example.

FIG. 5 (a) is a sectional view taken along the line A-A of FIG. 4 and FIG. 5 (b) is a sectional view taken along the line B-B of FIG. 4.

FIG. 6 (a) is a sectional view taken along the line A-A of FIG. 4 and FIG. 6 (b) is a sectional view taken along the line B-B of FIG. 4.

FIG. 7 (a) is a sectional view taken along the line A-A of FIG. 4 and FIG. 7 (b) is a sectional view taken along the line B-B of FIG. 4.

DETAILED DESCRIPTION OF THE INVENTION

Hereinafter, suitable embodiments of the diaphragm and the diaphragm valve according to the present invention will be explained with reference to the drawings.

Figure 1:
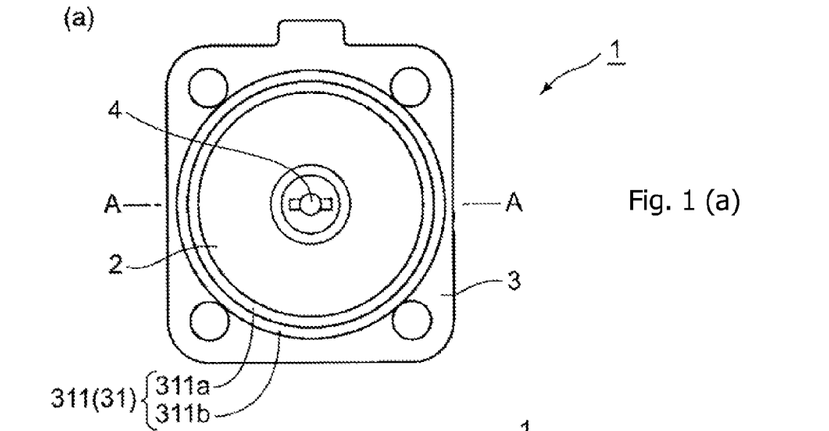
FIG. 1 shows views illustrating a diaphragm according to the present invention.
Figure 2:
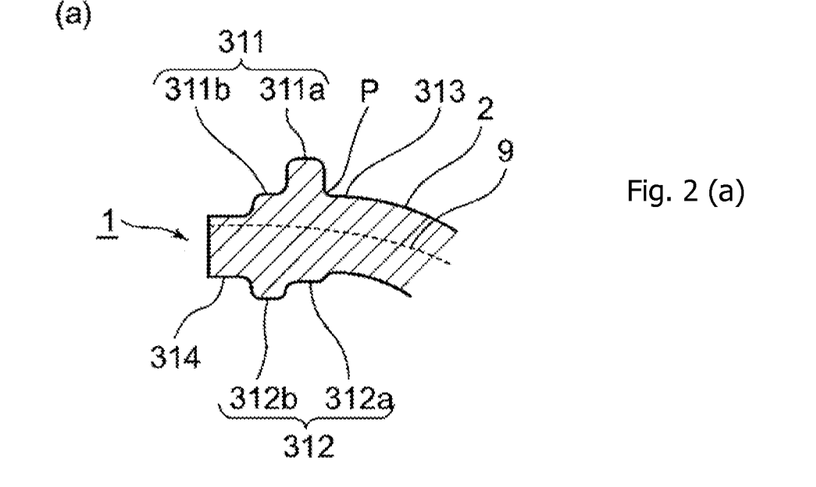

FIG. 1 shows views illustrating a diaphragm according to the present invention. FIG. 1 (a) is a top view, FIG. 1 (b) is a sectional view taken along the line A-A of FIG. 1 (a), and FIG. 1 (c) is a bottom view. FIG. 2 (a) is an enlarged view in the circle of FIG. 1(b) and FIG. 2 (b) shows the change example.

A diaphragm (1) according to the present invention comprises a membrane part (2) deforming and moving up and down with opening and closing of a flow channel of a diaphragm valve and a flange part (3) which is provided around this membrane part (2) and sandwiched between a valve body and a bonnet of a diaphragm valve.

The diaphragm (1) according to the present invention is a diaphragm of a single-layer structure consisting of rubber materials. As a rubber material, a natural rubber, a nitrile rubber, a styrene rubber, a fluoro rubber (FPM), an ethylene propylene diene monomer rubber (EPDM), etc. are conveniently used, but in particular an ethylene propylene diene monomer rubber (EPDM) is conveniently used among them.

The flange part (3) of the diaphragm (1) is provided with an annular ridge (31) and a vertical ridge (32) which is vertical to the annular ridge (31).

The annular ridge consists of an upper ridge (311) protruding upward and a lower ridge (312) protruding downward from a position corresponding to the upper ridge (311) in a radial direction of the diaphragm (1).

Besides, the vertical ridge (32) protrudes downward only.

The upper ridge (311) has an inner upper ridge (311a) and an outer upper ridge (311b) with its protruding height being lower than the inner upper ridge (311a), which are consecutively formed in a staircase pattern.

Therefore, the outer upper ridge (311b) can restrain deformation of the inner upper ridge (311a) to generate stress relaxation to the inner upper ridge (311a), so that reduction of sealing properties can be prevented. As a result, a diaphragm with excellent durability can be obtained.

Besides, the "height" in the specification is defined so that "upper parts are higher than lower parts" on the upper surface of the diaphragm and "lower parts are higher than upper parts" in the lower surface of the diaphragm.

The height of the inner vicinity part (313) of the inner upper ridge (311a) is lower than that of the outer upper ridge (311b).

Therefore, application of large stress to the root part (P) of the inner vicinity part (313) of the inner upper ridge (311a) can be prevented. Accordingly, a crack can be prevented from occurring in a short period of time with the root part (P) as a starting point, so that a diaphragm with further excellent durability can be obtained.

Hereinafter, the crack occurrence in the above-mentioned diaphragm will be explained in more detail with reference to FIG. 3, etc.

When the diaphragm (1) is mounted to the diaphragm valve (see FIGS. 5 to 7), the upper surface of the diaphragm (1) is pressed down by a bonnet (6).

Figure 3:
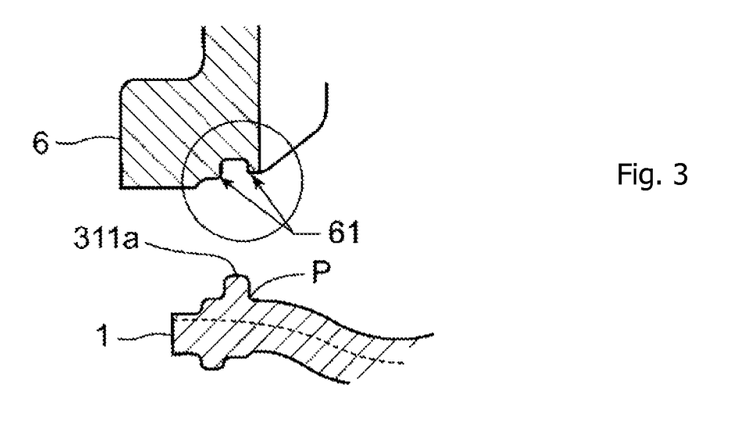
FIG. 3 is a partial enlarged view of the diaphragm according to the present invention and a bonnet which presses down the diaphragm from upward.

The lower surface of the bonnet (6), which abuts on the diaphragm (1), is provided with a groove for alignment of the inner upper ridge (311a) to be fitted therein, as shown in the circle of FIG. 3. When an inner edge part (61) of this groove abuts on an inner root part (P) of the inner upper ridge (311a) of the diaphragm (1), large stress is applied to the inner root part (P) in deforming the diaphragm, which becomes a starting point of crack occurrence.

In the present invention, the height of the inner vicinity part (313) of the inner upper ridge (311a) is lower than that of the outer upper ridge (311b), so that the edge part (61) of the groove for alignment does not abut on the root part (P) of the inner upper ridge (311a) and a crack can be prevented from occurring with the root part (P) as a starting point.

The height of the root part (P) of the inner upper ridge (311a) may become gradually lower from the inner upper ridge (311a) towards the inner vicinity part (313) (see FIG. 2 (a)) or may become once lower from the inner upper ridge (311a) towards the inner vicinity part (313) and then dented (see FIG. 2 (b)).

The lower ridge (312) has an inner lower ridge (312a) and an outer lower ridge (312b) with its protruding height being higher than the inner lower ridge (312a), which are consecutively formed in a staircase pattern. Therefore, the inner lower ridge (312a), which functions as a sealing surface, can be securely and tightly contacted with respect to the valve body (5) with its wide area contacted, thereby improving sealing properties.

The protruding height of the inner lower ridge (312a) is higher than that of the outer vicinity part (314) of the outer lower ridge (312b).

Therefore, the inner lower ridge (312a), which functions as a sealing surface, can be tightly contacted with respect to the valve body (5) with high pressure, thereby improving sealing properties.

The diaphragm (1) according to the present invention has a feature also in a shape before deformation of the membrane part (2).

Figure 5:
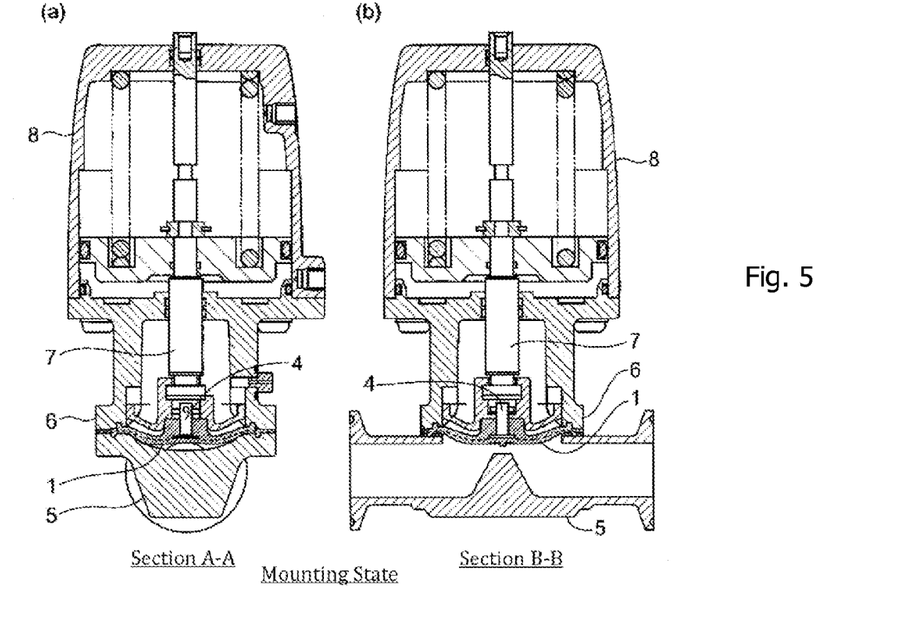
FIG. 5 shows views illustrating the mounting state of the diaphragm valve having the diaphragm according to the present invention.

"A shape before deformation" is a shape of the membrane part (2) before attaching the diaphragm to the diaphragm valve, in other words, a shape in molding a metallic mold of the diaphragm. FIGS. 1, 2 and 5 show the shapes before deformation.

The diaphragm (1) according to the present invention is formed in a curved surface shape where the shape before deformation of the lower surface of the membrane part (2) descends and then ascends from an outer edge part (21) towards a central part (22).

In particular, the lower surface of the membrane part (2) is positioned in the lowermost position in the intermediate part (23) between the outer edge part (21) and the central part (22), as shown in FIG. 1 (b), formed in a curved surface shape to descend from the outer edge part (21) towards the intermediate part (23) (referred as a first curved surface (I)), and formed in a curved surface shape to ascend from the intermediate part (23) towards the central part (22) (referred as a second curved surface (II)). In other words, the lower surface of the diaphragm (1) is formed in a curved surface shape where it has longitudinal plane shapes which are consecutive in a substantially W shape.

The first curved surface (I) and the second curved surface (II) are consecutively provided. The vertical ridge (32) is formed on the central part (22), which will be mentioned below. The first curved surface (I) descends from the outer edge part (21) towards the intermediate part (23). After the second curved surface (II) ascends from the intermediate part (23) towards inward direction (central direction) to reach the vertical ridge (32), it descends towards the central part (22) in the vertical ridge (32).

The second curved surface (II) is in an upper position from the intermediate part (23) except the central part (22), and the central part (22) is in a substantially equal position to the intermediate part (23) in a vertical direction.

In addition, in the present invention, a vertical direction is a direction along a stem axis of the diaphragm valve, an upward direction is a direction in which a suspending metal fitting (4) linked with the stem of the diaphragm valve protrudes (an upward direction in FIG. 1 (b)), and a downward direction is an opposite direction of the upward direction (an downward direction in FIG. 1 (b)).

Figure 4:
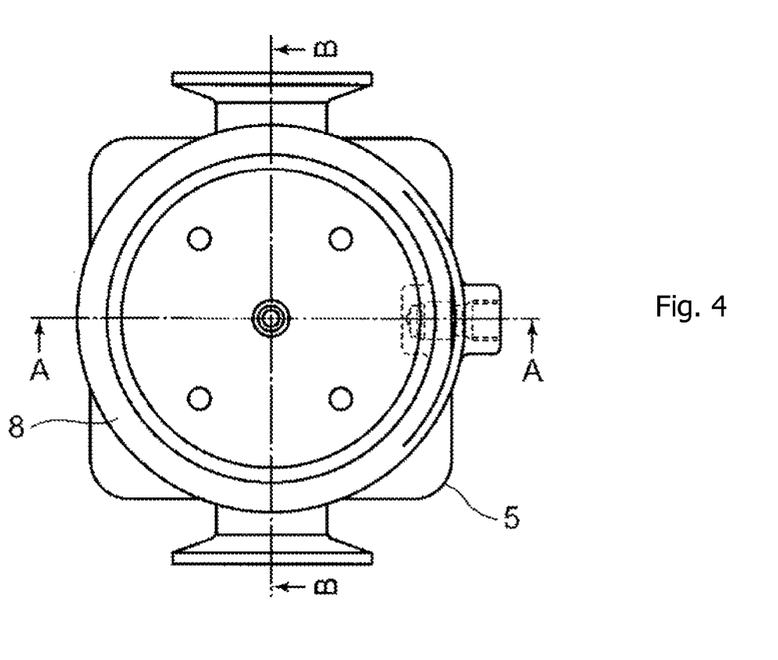
FIG. 4 is a top view (top view common to a mounting state, a full opened flow channel state, and a full closed flow channel state) showing a diaphragm valve having the diaphragm according to the present invention.
Figure 6:
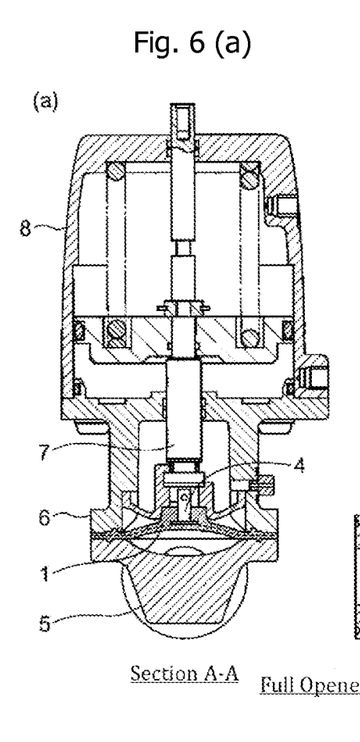
FIG. 6 shows views illustrating the full opened flow channel state of the diaphragm valve having the diaphragm according to the present invention.
Figure 7:
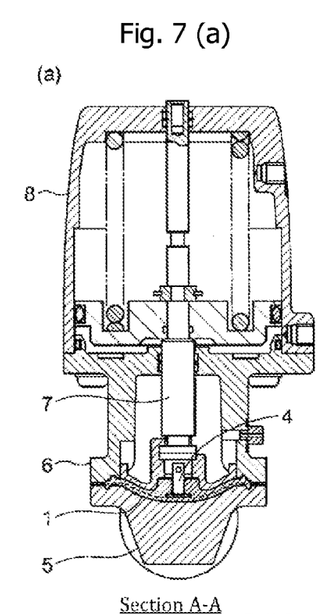
FIG. 7 shows views illustrating the full closed flow channel state of the diaphragm valve having the diaphragm according to the present invention.

FIGS. 4 to 7 are views showing a diaphragm valve having the diaphragm (1) according to the present invention. FIG. 4 is a top view of the diaphragm valve (a top view common to a mounting state, a full opened flow channel state, and a full closed flow channel state). FIGS. 5 to 7 are views showing the mounting state (FIG. 5), the full opened flow channel state (FIG. 6), and the full closed flow channel state (FIG. 7) of the diaphragm valve having the diaphragm according to the present invention, respectively, and in each figure, (a) is a sectional view taken along the line A-A of FIG. 4 and (b) is a sectional view taken along the line B-B of FIG. 4. The diaphragm valve comprises a valve body (5) having a flow channel for fluid circulation, a diaphragm (1) which opens and closes the flow channel by abutting on and separating away from the flow channel, a bonnet (6) which sandwiches and fixes a flange part (3) of the diaphragm (1) between the valve body (5) and the bonnet (6), a stem (7) connected to the diaphragm (1) via a suspending metal fitting (4), and an operating mechanism (8) for moving up and down the stem (7).

Although, as an operating mechanism (8), a pneumatic actuator is shown in FIGS. 4 to 7, the operating mechanism (8) is not be limited to this and may be a manual handle, etc.

The diaphragm (1) according to the present invention is formed in a curved surface shape where the shape before deformation of the lower surface of the membrane part (2) descends and then ascends from the outer edge part (21) towards the central part (22), so that an amount of the deformation of the membrane part (2) with up and down movements of the diaphragm (1) decreases, compared with a diaphragm in a curved shape only in the conventional upward or downward direction, as can be understood from FIGS. 5 to 7.

Accordingly, even though the opening and closing operation of the diaphragm valve is repeated, a crack is less likely to occur to the diaphragm (1), thereby obtaining a diaphragm with excellent durability.

As shown in FIG. 1 (b), in the diaphragm (1) according to the present invention, the uppermost part of the lower surface of the membrane part (2) is positioned in the outer edge part (21) of the membrane part (2), and the lowest part is positioned in the intermediate part (23) between the outer edge part (21) and the central part (22).

It is preferable that a vertical direction distance (L) between the positions of the uppermost part and the lowest part of the lower surface of the membrane part (2) is a distance of 10% or less to the diameter (D) of the membrane part (2). Also, the diameter (D) of the membrane part (2) is equal to the internal diameter of a part which abuts on the diaphragm (1) of the bonnet (6).

In this way, by reducing a degree of the curve as a whole membrane part (to be 10% or less), an amount of the deformation of the membrane part (2) with up and down movements of the diaphragm (1) decreases largely, and thus, an improvement effect of durability can be securely obtained.

However, if the degree of the curve is too small, it possibly becomes difficult to securely open and close the flow channel. Thus, it is more preferable to set the distance (L) within a range of 5 to 10% to the diameter (D). For example, if the diameter (D) is ɸ54 mm, the distance (L) is set as about 5 mm.

The diaphragm (1) includes a reinforcing cloth (9) at a substantially intermediate position in a thickness direction of the diaphragm (1) so that the reinforcing cloth (9) substantially follows the shape of the diaphragm (1). The reinforcing cloth (9) is shown by the dashed line.

The curve of the diaphragm (1) according to the present invention is smaller compared with the conventional diaphragms, as mentioned above. Thus, it becomes easy to place the reinforcing cloth (9) at a substantially intermediate position in a thickness direction so that the reinforcing cloth (9) follows the shape of the diaphragm in molding a metallic mold. Accordingly, a reinforcement effect can be exhibited by the reinforcing cloth, thereby obtaining an improvement effect of excellent durability.

A quality of the material of the reinforcing cloth (9) is not specifically limited, and thus, a carbon fiber, a synthetic resin, a metal, a carbon fiber, etc. can be used, but in particular, a nylon is conveniently used which is excellent in durability against repeated deformation of the diaphragm.

Moreover, in order to improve durability, the surface of the diaphragm may be coated in a thin film state with the resin film (not shown). A PTFE film is conveniently used for the resin film.

Additionally, in the present invention, the shape before deformation of the membrane part (2) of the diaphragm (1) (curved shape) is not limited to that in the examples of the figures, and thus, known various shapes can be suitably adopted unless departing from the scope of the invention.

Moreover, the diaphragm valve according to the present invention is not limited to a weir type diaphragm valve in which a valve seat rises in the flow channel as shown in the examples of the figures, and thus, it may be a diaphragm valve without the risen valve seat.

INDUSTRIAL APPLICABILITY

The present invention is conveniently employed for a diaphragm valve used, for example, for opening and closing of a sampling pipe, liquid supply pipe, etc. in an apparatus for culturing microbes.

EXPLANATIONS OF NUMERALS

1 Diaphragm
2 Membrane Part
3 Flange Part
31 Annular Ridge
32 Vertical Ridge
311 Upper Ridge
311a Inner Upper Ridge
311b Outer Upper Ridge
312 Lower Ridge
312a Inner Lower Ridge
312b Outer Lower Ridge
313 Inner Vicinity Part of Inner Upper Ridge
314 Outer Vicinity Part
5 Valve Body
6 Bonnet
7 Stem
8 Operating Mechanism

What is claimed is:

1. A diaphragm attached to a diaphragm valve, having a single-layer structure comprising rubber materials, and comprising;
a membrane part deforming and moving up and down with opening and closing of a flow channel and a flange part which is provided around said membrane part and sandwiched between a valve body and a bonnet,
wherein said flange part has an annular ridge,
wherein said annular ridge comprises an upper ridge protruding upward and a lower ridge protruding downward from a position corresponding to said upper ridge,
wherein said upper ridge has an inner upper ridge and an outer upper ridge with a protruding height of said outer upper ridge being lower than a protruding height of the inner upper ridge, which are consecutively formed in a staircase pattern, and
further wherein said lower ridge has an inner lower ridge and an outer lower ridge with a protruding height of the outer lower ridge being higher than a protruding height of the inner lower ridge, which are consecutively formed in a staircase pattern.

2. The diaphragm of claim 1, wherein an upper surface of the flange part adjacent the inner upper ridge is an inner vicinity part of the inner upper ridge and a height of the inner vicinity part of said inner upper ridge is lower than that of said outer upper ridge.

3. The diaphragm of claim 1, wherein a lower surface of the flange part adjacent the outer lower ridge is an outer vicinity part of the outer lower ridge and the height of said inner lower ridge is higher than that of the outer vicinity part of said outer lower ridge.

4. The diaphragm of claim 1, wherein the diaphragm includes a reinforcing cloth at a substantially intermediate position in a thickness direction.

5. The diaphragm of claim 4, wherein said reinforcing cloth comprises nylon.

6. The diaphragm of claim 1, wherein the surface of the diaphragm is coated in a thin film state with a resin film.

7. A diaphragm valve having the diaphragm of claim 1.

* * * * *